(12) United States Patent
Frattini et al.

(10) Patent No.: US 10,982,469 B2
(45) Date of Patent: Apr. 20, 2021

(54) VEHICLE PANEL HANDLE LEVER

(71) Applicant: U-SHIN ITALIA S.P.A., Pianezza (IT)

(72) Inventors: Massimo Frattini, Pianezza (IT);
Alberto Gramaglia, Pianezza (IT);
Alberto Tropini, Pianezza (IT)

(73) Assignee: U-SHIN ITALIA S.P.A., Pianezza (IT)

( * ) Notice: Subject to any disclaimer, the term of this patent is extended or adjusted under 35 U.S.C. 154(b) by 1007 days.

(21) Appl. No.: 14/425,920

(22) PCT Filed: Sep. 6, 2013

(86) PCT No.: PCT/EP2013/068425
§ 371 (c)(1),
(2) Date: Mar. 4, 2015

(87) PCT Pub. No.: WO2014/037478
PCT Pub. Date: Mar. 13, 2014

(65) Prior Publication Data
US 2015/0225987 A1    Aug. 13, 2015

(30) Foreign Application Priority Data
Sep. 7, 2012   (EP) .................................... 12425149

(51) Int. Cl.
*E05B 85/16*     (2014.01)
*E05B 77/06*     (2014.01)
(Continued)

(52) U.S. Cl.
CPC .............. *E05B 77/06* (2013.01); *E05B 81/78* (2013.01); *E05B 85/16* (2013.01); *G01V 3/00* (2013.01); *Y10T 292/57* (2015.04)

(58) Field of Classification Search
CPC .... Y10T 292/57; Y10S 292/22; Y10S 292/65; E05B 85/14; E05B 85/16; E05B 81/76;
(Continued)

(56) References Cited

U.S. PATENT DOCUMENTS 7,036,857 B2 *   5/2006   Ichino ..................... E05B 85/12
                                                        292/336.3
7,284,776 B2 *  10/2007   Cummins ............... E05B 85/16
                                                        292/336.3
(Continued)

FOREIGN PATENT DOCUMENTS

DE    10 2006 029774 A1    1/2008
DE       102011055289 A9 *  8/2013   ............. E05B 85/16
(Continued)

OTHER PUBLICATIONS

Computer Generated Translation for WO 99/28170, generated on May 23, 2019, https://worldwide.espacenet.com/ (Year: 2019).*
(Continued)

*Primary Examiner* — Alyson M Merlino
(74) *Attorney, Agent, or Firm* — Burris Law, PLLC

(57) ABSTRACT

A vehicle panel handle lever and a vehicle panel handle for opening a panel of an automotive vehicle having such a lever is disclosed. The handle lever has a lever body, a handle lever cover intended to be received on the lever body, and a mobile trigger part, which cooperates with a latch mechanism to actuate the handle and which is able to be mobile in rotation between a resting position where the mobile trigger part does not activate the latch mechanism, and an activating position where the mobile trigger part activates the latch mechanism enabling the opening of the vehicle panel. The trigger part includes an inner volume designed for receiving at least one electrical element.

13 Claims, 1 Drawing Sheet

(51) Int. Cl.
    *E05B 81/78* (2014.01)
    *G01V 3/00* (2006.01)
(58) Field of Classification Search
    CPC .......... E05B 81/77; E05B 81/78; E05B 77/06;
        E05B 85/10; E05B 15/0093; E05B 85/12
    See application file for complete search history.

(56) References Cited

U.S. PATENT DOCUMENTS

| | | | | |
|---|---|---|---|---|
| 7,527,307 | B2 * | 5/2009 | Belchine, III | E05B 77/06 |
| | | | | 292/336.3 |
| 9,909,342 | B2 * | 3/2018 | Ilardo | E05B 77/06 |
| 2005/0093306 | A1 * | 5/2005 | Pudney | E05B 85/16 |
| | | | | 292/216 |
| 2005/0134059 | A1 * | 6/2005 | Ichino | E05B 85/12 |
| | | | | 292/336.3 |
| 2007/0146119 | A1 * | 6/2007 | Mizushima | E05B 81/78 |
| | | | | 340/5.72 |
| 2010/0088856 | A1 * | 4/2010 | Mueller | E05B 81/78 |
| | | | | 70/91 |
| 2011/0285150 | A1 * | 11/2011 | Angelo | E05B 77/06 |
| | | | | 292/336.3 |
| 2012/0167642 | A1 * | 7/2012 | Savant | E05B 81/76 |
| | | | | 70/91 |
| 2013/0020814 | A1 * | 1/2013 | McConnell | E05B 53/001 |
| | | | | 292/194 |
| 2014/0312633 | A1 * | 10/2014 | Ilardo | E05B 77/06 |
| | | | | 292/336.3 |

FOREIGN PATENT DOCUMENTS

| | | | | |
|---|---|---|---|---|
| EP | 1 338 731 A2 | | 8/2003 | |
| WO | WO-9928170 A1 | * | 6/1999 | ............ E05B 85/10 |
| WO | 2011/061281 A2 | | 5/2011 | |
| WO | 2011/077222 A2 | | 6/2011 | |
| WO | WO-2012092918 A2 | * | 7/2012 | ............ E05B 77/06 |

OTHER PUBLICATIONS

Computer Generated Translation for WO 2012/092918, generated on May 23, 2019, https://worldwide.espacenet.com/ (Year: 2019).*
"Light-Emitting Diode (LED): How Products are Made," Oct. 18, 2006 (Year: 2006).*
Computer Generated Translation for DE 102011055289 A9, Generated on Dec. 7, 2020, https://worldwide.espacenet.com/ (Year: 2020).*
International Search Report issued in PCT/EP2013/068425 dated Oct. 23, 2013 (3 pages).

* cited by examiner

VEHICLE PANEL HANDLE LEVER

BACKGROUND

The invention relates to a vehicle panel handle lever comprising a lever body, a handle lever cover intended to be received on the lever body, and a mobile trigger part, intended to cooperate with a latch mechanism to actuate the panel handle and which is able to be mobile in rotation between a rest position wherein the said mobile trigger part does not activate the said latch mechanism and an activating position wherein said mobile trigger part activates the said latch mechanism enabling the opening of the vehicle panel. The invention also relates to a vehicle panel handle for opening a panel of an automotive vehicle comprising such lever.

An handle for an automotive vehicle panel, specifically a side door, usually comprises a lever being fixed in a support but able to rotate when pull by the user. The support is mounted in the panel.

Some handle lever comprises a mobile trigger part which is a part capable of rotating for coming inside the cover of the lever. The said lever is intended to receive the hand of the user.

The mobile trigger part is also intended to cooperate with a latch mechanism to actuate the handle. The lever cover is, in such handle, fixed on the vehicle panel, specifically on a bracket, and can thus not be moved by the user. The mobile trigger part is mobile in rotation thanks to a rotation axis located into the handle inner volume. The trigger part passes through the lever cover in the grip area in order to be actuated by the user. The Bowden cable connection enabling the opening of the panel is placed onto the opposite side of the lever rotation axis. Thus by pushing the trigger part, the Bowden cable is moved which leads to the opening of the latch.

Another handle lever comprises a mobile lever cover for receiving the mobile trigger part. The trigger part is pushed in the same time that the user grips the lever cover to generate the rotation of the assembly comprising the lever cover and the trigger part.

This kind of handle usually needs no inertial system to lock the kinematics during the crash event due to the weak weight of the lever cover and the trigger part.

Nowadays a lot of automotive vehicles are equipped with one or several electrical elements, such as Hall effect sensor, reed relay, microswitch, antenna or capacitive sensor for detecting the presence of at least a part of an authorized user, for example the hand.

Therefore, there is a need for providing a vehicle panel handle with a handle lever comprising at least one electrical element which is efficient and easy to manufacture.

SUMMARY

According to one aspect, the present invention has for object a vehicle panel handle lever comprising:
 a lever body,
 a handle lever cover intended to be received on the lever body,
 a mobile trigger part, intended to cooperate with a latch mechanism to actuate the handle and which is able to be mobile in rotation between a resting position wherein the said mobile trigger part does not activate the said latch mechanism and an activating position wherein said mobile trigger part activates the said latch mechanism enabling the opening of the vehicle panel,
 wherein the trigger part comprises an inner volume designed for receiving at least one electrical element.

Thanks to the configuration of the vehicle panel lever of the invention, the at least one electrical element is integrated inside the lever, more precisely in the mobile trigger part. The trigger part becomes a protection for this electrical element since the motion of the mobile trigger part does not interfere with the working of each electrical element.

The lever and then the handle comprising such lever are efficient, reliable and easy to manufacture.

Furthermore, the handle lever of the invention and the handle itself keep a slim design.

The present invention may also comprise the following features taken alone or in combination:
 the inner volume is divided into several recesses for receiving each one or several electrical elements;
 one electrical element is an electrical detector intended to detect the presence of at least a part of the body of an user;
 the electrical detector is selected in the list consisting of an antenna, a capacitive sensor, a Hall effect sensor and a relay reed;
 one electrical element is a microswitch intended to operate an element;
 the trigger part receives one or more inertial mass;
 the inertial mass is made in zamak®, steel or plastic material;
 the inertial mass is formed by the electrical element, such as the electrical detector or the microswitch;
 the lever of the invention comprises further fixing means for maintaining the at least one electrical element inside the mobile trigger part;
 the lever of the invention comprises locking means for preventing the activation of the latch mechanism when the mobile part lever is in rest position;
 the mobile trigger part is associated with elastic means enabling the said mobile trigger part to come back to the resting position after having passing through the activating position;
 the mobile trigger part and at least one electrical element is sealed together with resins in order to reach important water proofness.

According to another aspect, the present invention has for object a vehicle panel handle for opening a panel of an automotive vehicle comprising:
 an opening latch mechanism configured to allow opening of the panel when actuated,
 a vehicle panel handle lever according to any one of the preceding claims and configured to actuate the opening mechanism when set in motion.

According to an embodiment, the vehicle panel handle according to the invention comprises a bracket on which is mounted the vehicle panel handle lever.

BRIEF DESCRIPTION OF THE DRAWINGS

The present invention will be better understood at the light of the following description given as an example and illustrated by the following drawings.

DETAILED DESCRIPTION

On all figures, the same references relate to the same elements.

Figure 1:
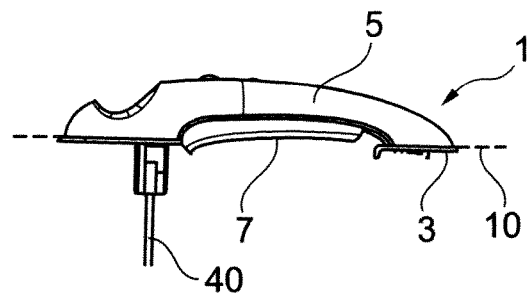
FIG. 1 is a perspective side view of a handle lever according to one embodiment of the invention.
Figure 2:
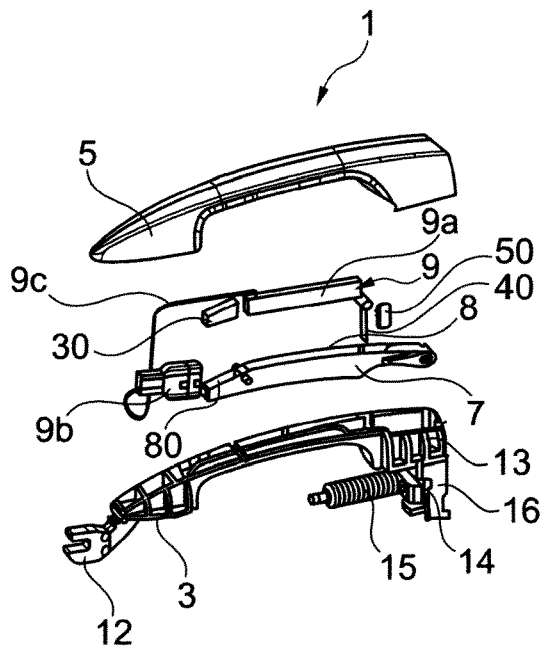
FIG. 2 is an exploded perspective side view of the handle lever of FIG. 1.

As shown on the FIG. 2, the handle lever 1 of the present invention comprises:
- a lever body 3,
- a handle lever cover 5 intended be received on the lever body 3, and
- a mobile trigger part 7, intended to cooperate with a latch mechanism (not shown) to actuate the handle (not shown) and which is able to be mobile in rotation between a resting position wherein the said mobile trigger part 7 does not activate the said latch mechanism and an activating position wherein said mobile trigger part 7 activates the said latch mechanism enabling the opening of the vehicle panel.

According to the invention, the trigger part 7 comprises an inner volume 8 designed for receiving at least one electrical element.

One or several electrical element 9 are then received inside the trigger part housing.

Such configuration enables to save space and therefore keep a slim and compact design of the handle comprising such handle lever 1.

The said electrical element 9 works efficiency since the motion of the trigger part 7 does not interfere with the working of each electrical element 9 since the said trigger part 7 forms a protective shell around the said at least one electrical element 9.

The lever 1 and then the handle comprising such lever are efficient, reliable and easy to manufacture. The at least one electrical element 9 is placed in the inner volume 8 of the trigger part 7 and then the trigger part is mounted in the lever body 3. The said lever body 3 is then covered by the lever cover 5.

According to a variant, the lever body 3 and the lever cover 5 may be made into one piece configured for receiving the trigger part 7 and enabling the motion of the latter through the said one piece.

The assembly comprising the lever body 3, the lever cover 5 and the trigger part 7 is mounted on the vehicle panel and may be on a specific bracket.

The vehicle panel may be for example a door, specifically a side door.

The lever body 3 may be of different material, for example plastics. In such case, the lever body 3 may be made by molding injection.

If the handle is configured for having both the trigger part 7 and the handle lever mobile in rotation, the said lever body 3 may have an end 12 capable of cooperating with an hinge of the support (not shown). The other end 1" may be configured for receiving the body of a lock (not shown) capable of receiving the key of the user.

At this end 13, the lever body 3 may comprise means for cooperating with an opening latch mechanism, which is represented as a main lever 14 in FIG. 2. The said opening latch mechanism is able to activate a Bowden cable for activating a latch (not shown). More specifically, the said main lever 14 is associated with elastic means 15 enabling to go back to the resting position after being in the activating position. In the illustrated embodiment, the elastic means 15 are torsion spring.

The said main lever 15 is also connected to a Bowden arm 16 linked to the Bowden cable.

The lever cover 5 may be made of any material suitable for resisting to atmospheric condition and also compatible with aesthetic aspects. The said lever cover 5 is typically hollow for receiving the lever body 3 and the trigger part 7.

As mentioned above, the lever cover 5 and the lever body 3 may be made into one unique piece, for example in plastic. If the lever body 3 and the lever cover 5 are two distinct elements, these two elements may be fixed by fixing means, such as screws, clips, glue or any combination of them.

The trigger part 7 comprises an inner volume 8 for receiving one or several electrical elements 9.

Advantageously, the inner volume 8 may be divided into several recesses for receiving each one or several electrical elements 9. Each recess may be formed by a wall sensibly transversal relative to the main axis of the trigger part 7.

In the embodiment illustrated on all figures, the handle lever has an elongated shape, such as the lever body 3, lever cover 5 and the trigger part 7, along a main axis 10.

Therefore, it is possible to separate at least two electrical elements 9 in several inner volumes 8 which improves the protection of such electrical elements 9 and also facilitates the assembly of the handle lever 1 of the invention.

The mobile trigger part 7 and at least one electrical element 9 may be sealed together, for example with resins, in order to reach important waterproof quality. The presence of a plurality of recesses inside the trigger part 7 facilitates the sealing step.

According to one aspect of the invention, one electrical element 9 may be an electrical detector intended to detect the presence of at least a part of the body of an use. As an example, a hand may be cited.

The said electrical detector may be an antenna, a capacitive sensor, a Hall effect sensor or a relay reed.

Figure 3:
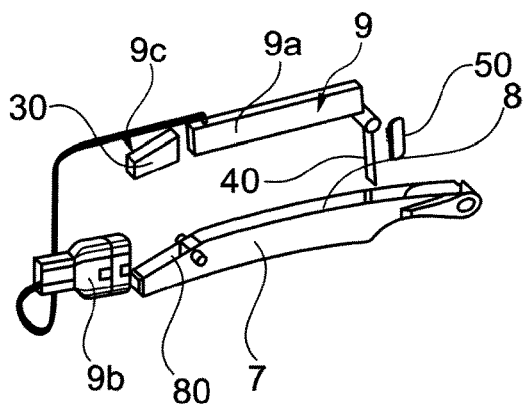
FIG. 3 is an exploded perspective side view of the mobile trigger part of FIG. 2.
Figure 4:
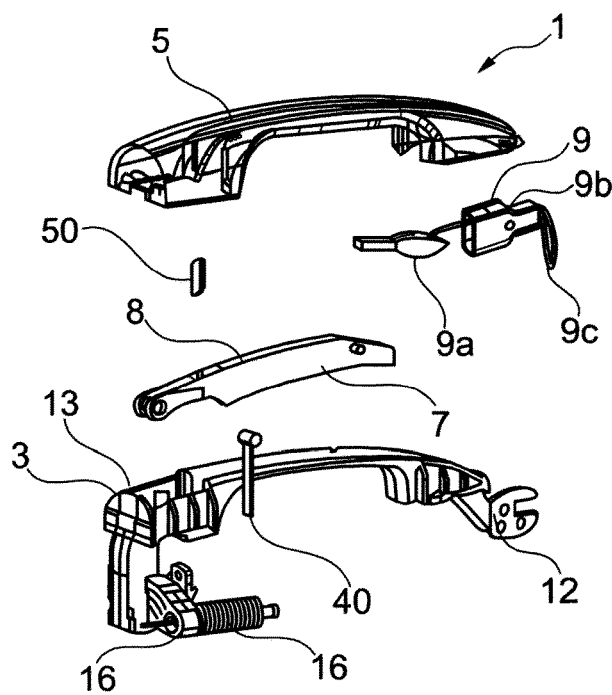
FIG. 4 is an exploded perspective side view of the handle lever of another embodiment.

As shown in FIGS. 2 to 4, the antenna 9a used may be associated with a connector 9b and linked together by one or several wires 9c.

The trigger part 7 may have at least one opening for enabling elements, such as wire or cable, to go through the said trigger part 7.

One electrical element 9 may be a micro-switch intended to operate an element, such as door latch.

The handle lever 1 of the invention may thus receive several detectors wherein each has a specific function. There is thus no need to create space in the lever body 3 for receiving these detectors. Therefore, it is possible to save a lot of space and reaching high compactness.

According to an embodiment, the trigger part 7 may receive one or more inertial mass 30 (see FIGS. 2 and 3). The presence of one or more electrical elements 9 tends to increase the mass of the trigger part. Therefore, in case of a crash event of the automotive vehicle, it may be required to add an inertial mass for preventing the opening of the panel by the unwilling activation of the latch mechanism. The inertial mass may be formed by one or several electrical elements 9, such as the electrical detector and/or the micro-switch (see FIG. 4). In this perspective such electrical element 9 may be made heavier by antenna ferrite, encapsulating resin, electronic components, printed circuit board.

The inertial mass may be a supplementary mass made in zamak®, steel or plastic material (see FIGS. 2 and 3). It is also possible to use heavier electrical element and also a supplementary inertial mass.

As shown in FIGS. 2 and 3, the said supplementary mass 30 may be placed in a recess 80 distinct from the one of the electrical elements 9. If several inertial masses are used, the said masses may be placed in one or in several recesses.

The handle lever 1 of the present invention may comprise further fixing means (not shown) for maintaining the at least one electrical elements 9 inside the mobile trigger part. For example, such fixing means may be screws, clips, glue or any combination of them.

The handle lever 1 of the present invention may also comprise locking means for preventing the activation of the latch mechanism when the mobile trigger part 7 is in the resting position. For example, such locking means may be one or several pin 40 around which the trigger part 7 is mobile in rotation. The said pin 40 may be blocked inside the lever body.

The mobile trigger part 7 may also be associated with elastic means 50 enabling the said mobile trigger part 7 to come back to the resting position after having passing through the activating position. The said elastic means may be one or several compression spring.

The present invention also comprise a vehicle panel handle comprising an opening latch mechanism (not shown) configured to allow opening of the panel when actuated and a vehicle panel handle lever 1 according to the invention and configured to actuate the opening mechanism when set in motion. The handle may also comprise a bracket on which is mounted the vehicle panel handle lever.

The invention claimed is:

1. A vehicle panel handle lever comprising:
a lever body;
a handle lever cover intended to be received on the lever body; and
a mobile trigger part which cooperates with a latch mechanism to actuate the latch mechanism and which is able to be mobile in rotation between a resting position, in which the mobile trigger part does not activate the latch mechanism, and an activating position, in which said mobile trigger part activates the latch mechanism, enabling an opening of a vehicle panel,
wherein the mobile trigger part comprises an inner volume configured to receive one or more electrical elements, and
wherein the mobile trigger part further comprises one or more inertial masses,
wherein a corresponding inertial mass of the one or more inertial masses is received by the inner volume separately from said one or more electrical elements,
wherein a corresponding electrical element of the one or more electrical elements weighs more than the corresponding inertial mass of the one or more inertial masses and the corresponding inertial mass compensates for the weight of the corresponding electrical element of the one or more electrical elements to prevent the opening of the vehicle panel by an unwilling activation of the latch mechanism.

2. The lever according to claim 1, wherein the inner volume is divided into several recesses, wherein one of the several recesses is configured to receive a corresponding electrical element of the one or more electrical elements.

3. The lever according to claim 2, wherein the corresponding inertial mass of the one or more inertial masses is disposed in one of the several recesses distinct from the corresponding electrical element of the one or more electrical elements.

4. The lever according to claim 1, wherein a corresponding electrical element of the one or more electrical elements is an electrical detector that detects the presence of at least a part of a body of a user.

5. The lever according to claim 4, wherein the electrical detector is selected from the group consisting of an antenna, a capacitive sensor, a Hall effect sensor, and a relay reed.

6. The lever according to claim 1, wherein the one or more electrical elements comprise a microswitch that operates the latch mechanism.

7. The lever according to claim 1, wherein the corresponding inertial mass of the one or more inertial masses is made of a steel or a plastic material.

8. The lever according to claim 1, further comprising fixing means for maintaining the one or more electrical elements in the inner volume of the mobile trigger part.

9. The lever according to claim 1, further comprising at least one pin for preventing the activation of the latch mechanism when the mobile trigger part is in the resting position.

10. The lever according to claim 1, wherein the mobile trigger part is associated with elastic means enabling the mobile trigger part to come back to the resting position from the activating position.

11. The lever according to claim 1, wherein the mobile trigger part and the one or more electrical elements are sealed together with resins.

12. The lever according to claim 1, wherein the lever body comprises an end that cooperates with a hinge for supporting a rotation of the vehicle panel handle lever.

13. The lever according to claim 1, wherein the corresponding inertial mass of the one or more inertial masses is a non-electrical component.

\* \* \* \* \*